H. FISHER.
Lawn Mower.

No. 38,381.  Patented May 5, 1863.

Witnesses:
J. W. Coombs
G. W. Reed

Inventor:
Henry Fisher
per Munn & Co.
Attorneys.

UNITED STATES PATENT OFFICE.

HENRY FISHER, OF ALLIANCE, OHIO.

IMPROVEMENT IN HAND MOWING-MACHINES.

Specification forming part of Letters Patent No. 38,381, dated May 5, 1863.

*To all whom it may concern:*

Be it known that I, HENRY FISHER, of Alliance, in the county of Stark and State of Ohio, have invented a new and Improved Mowing-Machine Designed for Manual Operation; and I do hereby declare that the following is a full, clear, and exact description of the same, reference being had to the accompanying drawings, making a part of this specification, in which—

Figure 1:
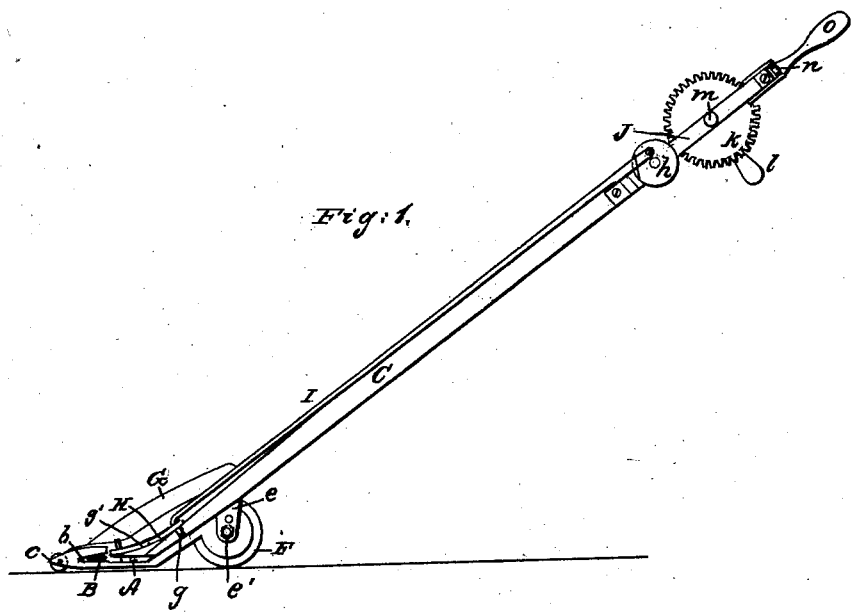
Figure 2:
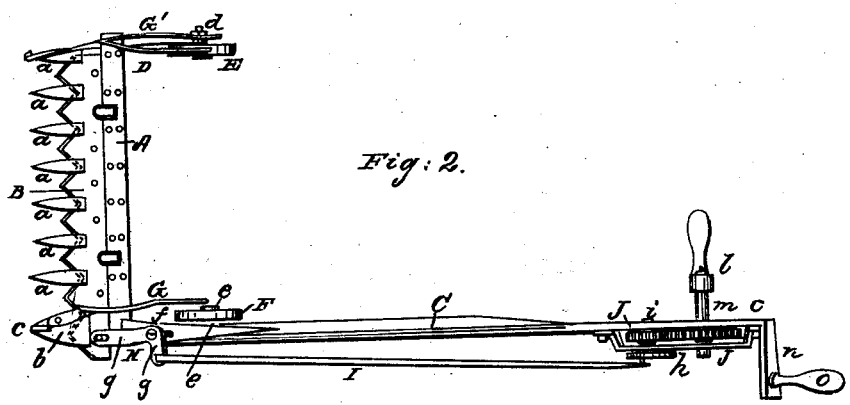

Figure 1 is a side elevation of my invention; Fig. 2, a plan or top view of the same.

Similar letters of reference indicate corresponding parts in the two figures.

This invention relates to a new and improved mowing-machine designed to be operated manually, and for cutting or mowing lawns.

The object of the invention is to supersede the ordinary sickle and lawn-scythe by obtaining a mowing-machine of simple and economical construction—one which will be durable, capable of being operated with a moderate expenditure of power, perform the work in a superior manner and more rapidly than by the hand-implements hitherto used.

To enable those skilled in the art to fully understand and construct my invention, I will proceed to describe it.

A represents the finger-bar of the machine, which is provided with fingers $a$, and B is a sickle which works on or within the fingers, in the same way as the sickles of the ordinary large mowing-machines. The finger-bar A is secured at one end and at right angles to a bar C, which serves as a handle. The front end of this bar C is flattened and bent obliquely with its main portion, so as to form a shoe, $b$, in the front end of which a small roller, $c$, is inserted. At the opposite end of the finger-bar A there is attached a short bar, D, which is parallel with the bar C, and has a roller, E, at its outer end, the axis $d$ of said roller being fitted in any of two or more holes in the bar D, the portion in which said holes are made being bent upward. To the bar C there is attached a pendant, $e$, in which a series of holes are made to receive the axis $e'$ of a roller, F, which roller is of the same size or diameter as the roller E, and in line with it. By this arrangement the rollers E F may be adjusted higher and the inclination of the bar C varied to suit the height of the operator without changing the proper relative position of the sickle with the surface of the ground.

To the shoe $b$ there is attached a curved bar, G, which serves as a guide for the cut grass as the latter passes behind the finger-bar A, and a similar bar or guide, G', is attached to the short bar D and on the finger $a$.

H represents a bent lever, which is attached by a fulcrum-pin, $f$, to the upper surface of the bar C. This bent lever has its arms $g\ g'$ of unequal length, and the short arm $g$ is connected to a rod, I, which extends nearly to the back end of bar C, and is attached to a crank-pulley, $h$, the axis or shaft $i$ of which has a pinion, $j$, upon it, said pinion gearing into a wheel, $k$, which has a crank, $l$, attached to its axis or shaft $m$. The axes or shafts $i\ m$ have their bearings in the bar C and in a bar, J, which is bolted to C, as shown clearly in Fig. 2. The back end of the bar C is bent at right angles to its main portion, as shown at $n$, and said part $n$ has a short handle, $o$, attached to it.

The operation is as follows: The operator grasps the handle $o$ with his left hand and shoves the machine forward, while he turns the crank $l$ with his right hand, and thereby communicates a reciprocating movement to the sickle B. By this arrangement it will be seen that the sickle is operated directly by hand and entirely independent of the supporting-rollers E F and propelling movement or power. Consequently a comparatively light machine may be constructed, as traction is not required in order to operate the sickle. If the sickle were operated from the rollers E F, the machine would be required to be sufficiently heavy to obtain necessary traction to drive the sickle, and besides this disadvantage the sickle would have an arbitrary movement, or one dependent on the propelling movement or power, and the sickle could not be increased in speed without increasing the speed of the propelling movement; hence in cases where the grass is heavy the machine would be liable to clog and work very imperfectly—a contingency which cannot occur in my invention, as I am enabled to move or shove the machine moderately along and at the same time operate the sickle rapidly, so that the latter may perform its work in a perfect manner.

Having thus described my invention, what I claim as new, and desire to secure by Letters Patent, is—

Operating the sickle B through the medium of the bent lever H, connecting-rod I, crank-pulley $h$, gearing $j\ k$, and crank $l$, when said sickle and its operating mechanism are used in connection with the bar C, rollers E F, and finger-bar A, all arranged and operated as shown, for the purpose set forth.

HENRY FISHER.

Witnesses:
 JOHN M. WEBB,
 WM. WOODWARD.